Feb. 13, 1962 G. RUSHING, JR 3,020,982
POWER ACTUATED EMERGENCY BRAKE
Filed May 27, 1958 2 Sheets-Sheet 1
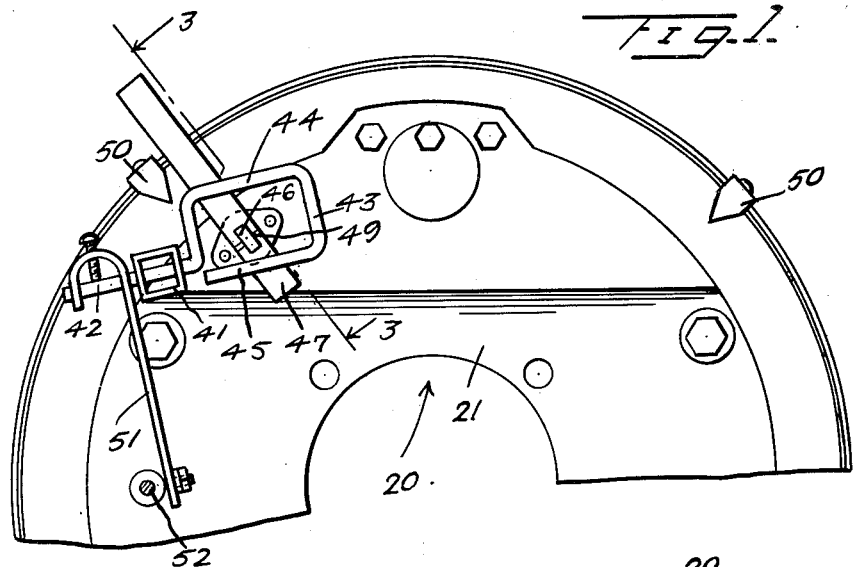
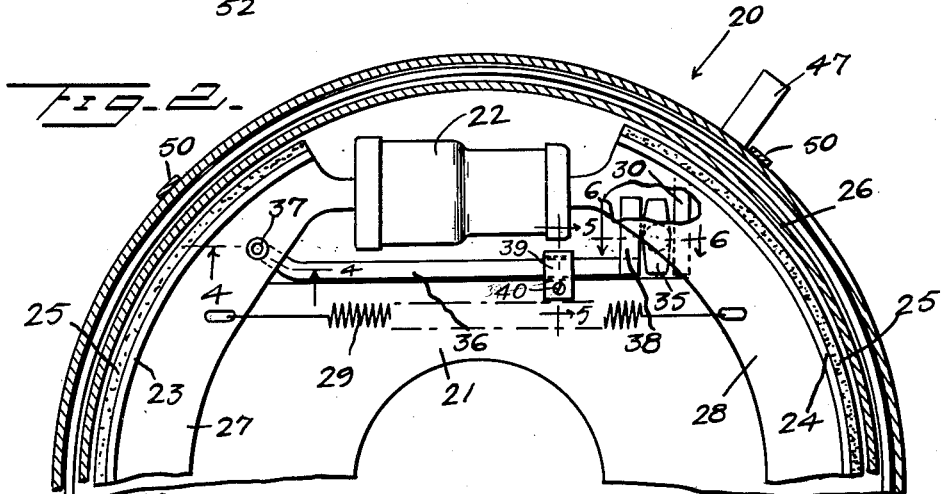
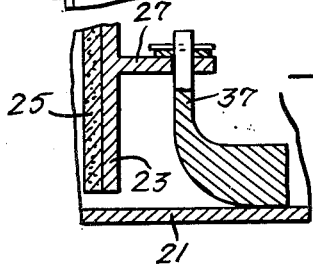
INVENTOR
George Rushing, Jr.
BY 
ATTORNEYS

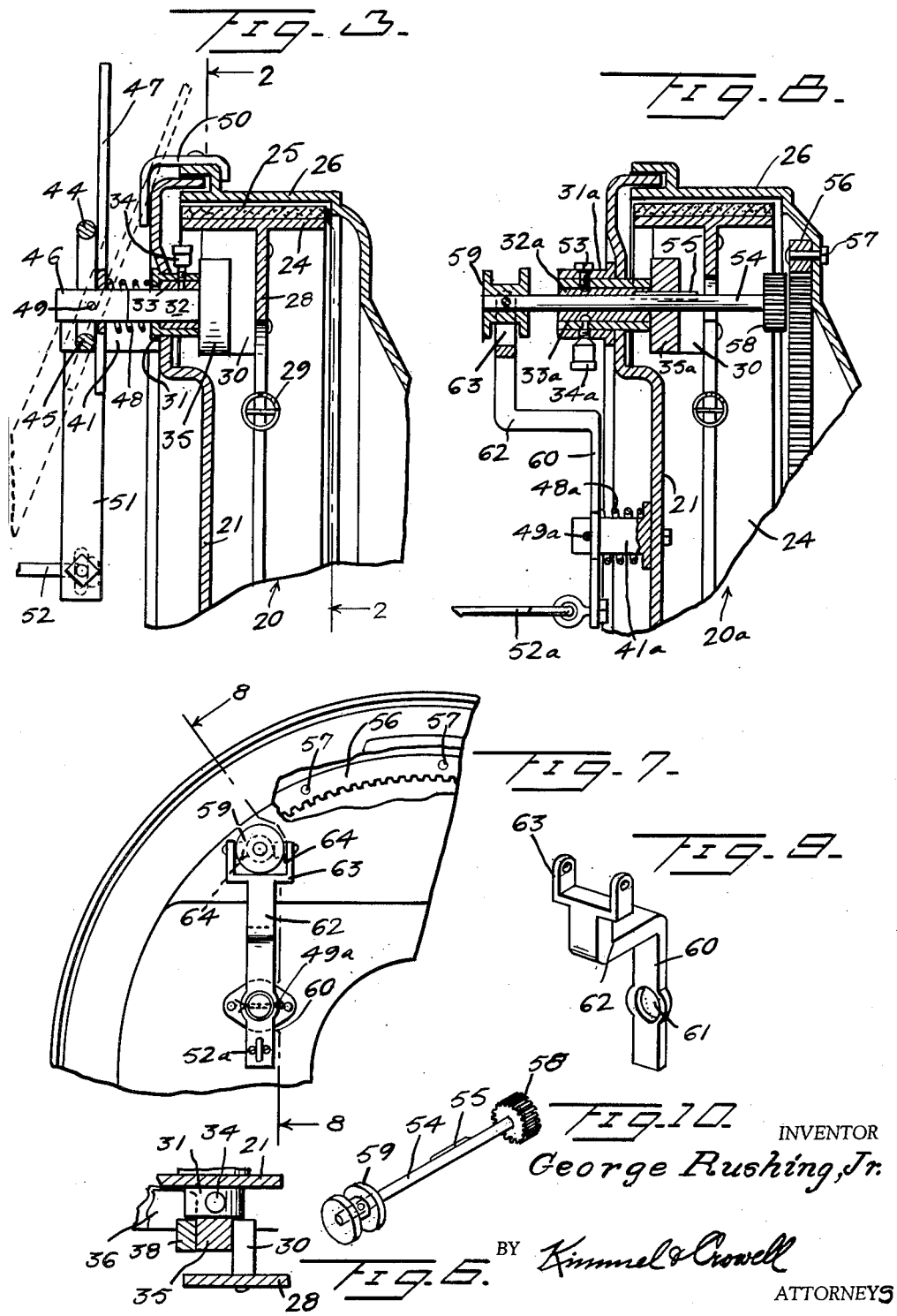

United States Patent Office 3,020,982
Patented Feb. 13, 1962

3,020,982
POWER ACTUATED EMERGENCY BRAKE
George Rushing, Jr., 7616 Kanis Road,
Little Rock, Ark.
Filed May 27, 1958, Ser. No. 738,089
11 Claims. (Cl. 188—140)

The present invention relates to power actuated emergency brakes, and more particularly to emergency brakes which are actuated by rotational movement of the brake wheel.

The primary object of the invention is to provide an emergency brake structure in which means releasably connected to the brake drum are provided for moving the brake shoes into contact with the brake drum upon rotational movement of the brake drum.

Another object of the invention is to provide a power actuated emergency brake under the complete control of the operator of the vehicle.

A still further object of the invention is to provide a power actuated emergency brake which utilizes the conventional existing brake shoes and which is applied through the power developed from the rotation of the brake drum.

Another object of the invention is to provide a power actuated emergency brake of the class described above which is inexpensive to manufacture, simple to use, and which is completely effective in applying the vehicle brakes.

Other objects and advantages will become apparent in the following specification when considered in the light of the attached drawings, in which:

FIGURE 1 is a fragmentary rear elevation view of the brake operating means according to the present invention.

FIGURE 2 is a fragmentary vertical cross-section taken along the line 2—2 of FIGURE 3, looking in the direction of the arrows.

FIGURE 3 is a fragmentary transverse section taken along the line 3—3 of FIGURE 1, looking in the direction of the arrows.

FIGURE 4 is an enlarged fragmentary horizontal section taken along the line 4—4 of FIGURE 2, looking in the direction of the arrows.

FIGURE 5 is an enlarged fragmentary vertical section taken along the line 5—5 of FIGURE 2, looking in the direction of the arrows.

FIGURE 6 is an enlarged fragmentary horizontal section taken along the line 6—6 of FIGURE 2, looking in the direction of the arrows.

FIGURE 7 is a fragmentary side elevation of a modified form of the invention shown partially broken away for convenience of illustration.

FIGURE 8 is an enlarged fragmentary vertical section taken along the line 8—8 of FIGURE 7, looking in the direction of the arrows.

FIGURE 9 is a perspective view of the operating lever shown in FIGURE 8.

FIGURE 10 is a perspective view of the drive shaft, yoke and spur gear unit illustrated in FIGURE 8.

Referring now to the drawings in detail wherein like reference characters indicate like parts throughout the several figures, the reference numeral 20 indicates generally a power actuated emergency brake constructed in accordance with the invention.

The power actuated emergency brake 20 includes a generally circular back plate 21 having a hydraulic wheel cylinder 22 secured thereto adjacent the upper end thereof. A pivotally mounted brake shoe 23 is secured to the backing plate 21 and engages at its upper end the wheel cylinder 22. A second pivotally mounted brake shoe 24 also is mounted on the backing plate 21 and engages the wheel service cylinder 22 at its upper end.

The brake shoes 23, 24 have brake lining 25 secured thereto in the conventional manner. A brake drum 26 of conventional design is associated with the backing plate 21 in encompassing relation to the brake shoes 23, 24 and is adapted to be engaged by the brake lining 25 on outward movement of the brake shoes 23, 24.

The brake shoe 23 has a web 27 formed thereon and the brake shoe 24 has a web 28 of similar configuration formed thereon. A brake spring 29 extends between and engages the webs 27, 28 normally biasing the brake shoes 23, 24 away from the drum 26.

The construction described above is of a conventional character and operates in a conventional manner so that when hydraulic pressure is exerted within the wheel cylinder 22, the brake shoes 23, 24 move outwardly to engage the brake lining 25 against the drum 26.

In the present invention, the brake shoes 23, 24 are engaged with the drum 26 under emergency operation in the following manner.

The brake shoe 24 is provided with a cam follower bar 30 rigidly secured thereto in generally upright relation. The backing plate 21 has a hollow sleeve 31 secured therein and a shaft 32 extends therethrough and is journalled in a tubular bushing 33. The hollow sleeve 31 has a lubrication fitting 34 secured thereto to lubricate the shaft 32 and the bushing 33. The shaft 32 has a double acting cam bar 35 rigidly secured to its inner end and having one side thereof in contact with the bar 30 on the brake shoe 24.

An elongated horizontal connecting member 36 has an offset shank portion 37 formed on one end, which extends through the web 27 of the brake shoe 23. The opposite end of the connector member 36 is provided with an offset cam follower end portion 38, which engages the opposite side of the double acting cam 35 from the bar 30.

A clip 39 is releasably secured to the backing plate 21 by a bolt 40 and guides the connector member 36 for horizontal sliding movement on the backing plate 21.

Rotational movement of the shaft 32 rotates the double acting cam 35 to move the bar 30 and the connector member 36 in opposite directions to move the brake shoes 23, 24 into engagement with the drum 26.

A hollow post 41 is fixed to the side of the backing plate 21 opposite the brake shoes 23, 24 adjacent to but spaced from the hollow boss 31.

A rock shaft 42 extends transversely through and is journalled in the post 41, as best shown in FIGURE 1. The shaft 42 has a generally rectangular loop or lever 43 formed integrally on one end thereof and provided with a pair of spaced apart parallel arms 44, 45 which extend parallel to the axis of the rock shaft 42. The shaft 32 has the end thereof opposite the cam 35 flattened at 46 and extending between the arms 44, 45.

A flat bar or lever 47 is engaged over the flat end portion 46 of the shaft 32, and a coil spring 48 encompassing the shaft 32 biases the bar 47 outwardly into engagement with a pin 49 extending through the flat portion 46 of the shaft 32. The bar 47 also is in contact with the loop 43, as can be best seen in FIGURE 3.

The brake drum 26 is provided with a plurality of circumferentially spaced scraper cleaning members, or lugs 50, which engage over the outer periphery of the backing plate 21 to prevent mud and dirt from collecting thereon.

A bracket 51 is releasably secured to the shaft 42 and has a cable 52 connected thereto which is adapted, when pulled, to rotate the rock shaft 42 to cause the loop 43 to move the bar 47 toward the brake drum 26 into the rotational path of the cleaning member 50, which contacts the bar 47 causing it to rotate the shaft 32 and the double acting cam member 35 to force the brake shoes 23, 24 into engagement with the drum 26, applying the brakes and locking the brake drum 26 almost instantaneously. The form of the double acting cam 35 is such that regardless of the direction of rotation of the shaft 32, the cam 35 will apply the brake shoes 23, 24 to lock the drum 26.

The control cable 52 may be operated by hand directly from the driver's seat of the vehicle on which the emergency brake 20 is mounted, or it can be controlled through any mechanical, electrical or hydraulic remote control system desired. The emergency brake 20, by its positive power action, locks the brake drum 26 almost instantaneously and provides an immediate emergency brake for the wheel when needed.

In FIGURES 7 through 10 a modified form of the invention is illustrated wherein an emergency brake system 20a includes a backing plate 21, brake shoe 24, and a brake drum 26, all identical with the preferred form of the invention. The brake shoe 24 has a bar 30 thereon.

The backing plate 21 has mounted thereon a hollow boss 31a having a hollow sleeve 32a mounted therein and journalled for rotation in a hollow bushing 33a. A double acting cam bar 35a is integrally carried on the inner end of the hollow sleeve 32a in aligned relation to the bar 30. The boss 31a has a grease fitting 34a secured thereto, and the bushing 33a is secured in the hollow boss 31a by a set screw 53 engaged therewith.

An elongated sleeve 54 is slidably mounted in the hollow shaft 32a and extends through the double acting cam 35a. A key 55 secures the sleeve 54 to the shaft 32a to prevent relative rotation therebetween, while permitting the shaft 54 to slide longitudinally with respect to the sleeve 32a. The brake drum 26 has a ring gear 56 secured thereto by bolts 57, and a gear 58 is fixed to the inner end of the shaft 54 and arranged for engagement with the ring gear 56 on sliding movement of the shaft 54.

The brakes in the modified form of the invention operate in an identical manner with those of the preferred form of the invention, with the exception that meshing engagement between the gear 58 and the ring gear 56 causes the double acting cam 35a to rotate to move the brake shoes 23, 24 outwardly into engagement with the drum 26.

The shaft 54 at the end thereof opposite the gear 58 is provided with a shipper collar 59, as can be best seen in FIGURES 7 and 8. A post 41a is secured to the backing plate 21 and extends outwardly therefrom oppositely of the brake drum 26. A lever 60 has a bore 61 formed therein engaging over the post 41a. A pin 49a extends transversely through the post 41a retaining the lever 60 in place thereon. A spring 48a encompasses the post 41a and maintains the lever 60 in contact with the pin 49a.

The lever 60 has an upstanding L-shaped offset extension 62 integrally formed thereon carrying a yoke 63 on its upper outer end. The yoke 63 is provided with a pair of inwardly extending pins 64 which engage in the shipper collar 59, so that movement of the lever 60 on the post 41a will longitudinally slide the shaft 54 to engage and disengage the gear 58 with the ring gear 56.

A cable 52a is connected to the end of the lever 60 opposite the yoke 63 to provide means for remotely controlling the emergency brake 20a in the same manner that the emergency brake 20 is controlled.

Having thus described the preferred embodiments of the invention, it should be understood that numerous structural modifications and adaptations may be resorted to without departing from the scope of the appended claims.

What is claimed is:

1. In a brake system for vehicles having brakes including a stationary plate, a rotatable drum concentrically positioned with respect to said plate, arcuate brake shoes pivotally mounted on said stationary plate and movable into engagement with said drum, and a spring interconnecting said brake shoes for biasing same out of engagement with said rotatable drum, an auxiliary operating means for said brake system comprised in part by at least one abutment on said rotatable drum, a connector bar slidably mounted on said stationary plate and pivotally secured at one end to one of said brakes shoes, cam follower bars disposed in closely spaced parallel relationship on the other end of said connector bar and the other of said brake shoes, respectively, a shaft journalled in said stationary plate, a cam on the shaft positioned between said cam follower bars, and means on said shaft engageable with the abutment on the rotatable drum for partially rotating the shaft to spread apart the cam followers bars and force the brake shoes into engagement with the drum.

2. In a brake system for vehicles having brakes including a stationary plate, a rotatable drum concentrically positioned with respect to said plate, arcuate brakes shoes pivotally mounted on said stationary plate and movable into engagement with said rotatable drum, and a spring interconnecting said brake shoes for biasing same out of engagement with said rotatable drum, an auxiliary operating means for said brake system comprised by arcuately spaced lugs on said rotatable drum, means including a bar mounted on said stationary plate for effecting movement of said brake shoes into engagement with said rotatable drum, and means mounted on said stationary plate including a lever having an offset portion engageable with said bar for moving the bar into the path of movement of the arcuately spaced lugs on the rotatable drum.

3. An emergency brake comprising a backing plate, a pair of brake shoes pivotally mounted on said backing plate, a brake drum associated with said backing plate and rotatable with respect thereto into position for engagement of said brake shoes with the inner face of said brake drum, service means mounted on said backing plate and engaging said brake shoes to move said brake shoes into contact with said brake drum, emergency operable means for said brake shoes including a rock shaft journalled in an opening in said backing plate and having on one end thereof cam means located between said brake shoes, the opposite end of said rock shaft projecting outwardly of said backing plate and having a flat portion, a lever slidably and tiltably fitted on said flat portion, means fixed on said brake drum for engaging and moving said lever toward said brake drum, spring means normally biasing said lever out of the path of said means on said brake drum, a second rock shaft journalled exteriorly on said backing plate on an axis substantially parallel thereto, and a loop fixed on said last mentioned rock shaft engaging said lever for moving said lever into position for said lever to be engaged by the means on said brake drum upon rotation of said last mentioned rock shaft.

4. Auxiliary braking means for a vehicle comprising a backing plate, a pair of brake shoes pivotally mounted on said backing plate, a brake drum associated with said backing plate and rotatable with respect thereto for engagement of said brake shoes with the inner face of said brake drum, hydraulic service means mounted on said backing plate for engaging said brake shoes to move said brake shoes into contact with said brake drum, additional manually actuated emergency means for moving said brake shoes into contact with said brake drum, said last mentioned means including a slidable bar extending between said pair of brake shoes, a rock shaft journalled in an opening in said backing plate and having on one end thereof cam means for moving said bar, the opposite end of said rock shaft projecting outwardly of said opening, a lever slidably keyed upon the opposite end of said rock shaft and movable into a position adjacent said brake drum, manually actuated means mounted exteriorly of said backing plate for sliding said lever along said rock shaft, and spaced projecting means on said drum engageable with said lever when moved adjacent to said brake drum to rock said cam means.

5. The structure of claim 4 wherein said lever means is further pivoted in a plane perpendicular to the plane of said backing plate to position said lever means relative to said brake drum for engagement by said spaced projecting means.

6. The structure of claim 4 wherein said projecting means comprise scraper cleaners.

7. An emergency brake comprising a backing plate, a pair of brake shoes pivotally mounted on said backing plate, a brake drum associated with said backing plate and rotatable with respect thereto into position for engagement of said brake shoes with the inner face of the brake drum, means mounted on said backing plate interiorly of said brake drum for engaging said brake shoes to move said brake shoes into contact with said brake drum, actuating means on said backing plate connected to said first mentioned means and having a portion extending outwardly of said backing plate, a lever mounted on said outwardly extending portion movable towards said brake drum into operative position, a plurality of cleaner members secured to said brake drum and revolvable therewith to engage said lever when in operative position to operate said actuating means for moving said brake shoes into contact with said drum on rotation of the brake drum with respect to said backing plate, means for moving said lever into inoperative position, and remote control means exteriorly of said backing plate for moving said lever into position for engagement by said scraper cleaning members comprising a shaft journalled exteriorly on said backing plate and a loop fixed to said shaft engaging said lever for moving said lever upon rotation of said shaft.

8. In a brake system for vehicles having brakes including a stationary plate, a rotatable drum concentrically positioned with respect to said plate, arcuate brake shoes pivotally mounted on said stationary plate and movable into engagement with said rotatable drum, a spring interconnecting said brake shoes for biasing same out of engagement with said rotatable drum, and a wheel cylinder having oppositely disposed pistons therein connected to said brake shoes for forcing same into engagement with said rotatable drum, an auxiliary operating means for said brake system comprised by arcuately spaced lugs on said rotatable drum, a connector bar slidably mounted on said stationary plate and pivotally secured at one end to one of said brake shoes, cam follower bars disposed in closely spaced parallel relationship on the other end of said connector bar and the other of said brake shoes respectively, a shaft journalled in said stationary plate, a cam on one end of the said shaft positioned between the cam follower bars, a bar slidably mounted on said shaft for partial rotation therewith, and means for sliding said bar along said shaft into the path of movement of the arcuately spaced lugs on the rotatable drum.

9. In a brake system for vehicles having brakes including a stationary plate, a rotatable drum concentrically positioned with respect to said plate, arcuate brake shoes pivotally mounted on said stationary plate and movable into engagement with said rotatable drum, a spring interconnecting said brake shoes for biasing same out of engagement with said rotatable drum, an auxiliary operating means for said brake system comprised by arcuately spaced lugs on said rotatable drum, a connector bar slidably mounted on said stationary plate and pivotally secured at one end to one of said brake shoes, cam follower bars disposed in closely spaced parallel relationship on the other end of said connector bar and the other of said brake shoes respectively, a shaft journalled in said stationary plate, a cam on one end of the shaft positioned between the cam follower bars, a bar slidably mounted on said shaft for partial rotation therewith, a rock shaft rotatably mounted on said stationary plate and having an offset portion engageable with said latter bar for sliding it along the shaft mounting same into the path of movement of the arcuately spaced lugs on the rotatable drum, an arm on said rock shaft, and a pull cable attached to said arm for partially rotating the rock shaft.

10. In a brake system for vehicles having brakes including a stationary plate, a rotatable drum concentrically positioned with respect to said plate, arcuate brake shoes pivotally mounted on said stationary plate and movable into engagement with said rotatable drum, and a spring interconnecting said brake shoes for biasing same out of engagement with said rotatable drum, an auxiliary operating means for said brake system comprised in part by a ring gear mounted on said rotatable drum, a connector bar slidably mounted on said stationary plate and pivotally secured at one end to one of said brake shoes, cam follower bars disposed in closely spaced parallel relationship on the other end of said connector bar and the other of said brake shoes respectively, a shaft slidably mounted in said stationary plate, a cam on said slidably mounted shaft positioned between said cam follower bars, a spur gear on said slidably mounted shaft engageable with the ring gear on the rotatable drum, and means mounted on said stationary plate for sliding said shaft to bring the spur gear into engagement with the ring gear to impart rotation to the said shaft for spreading apart the cam follower bars and forcing the brake shoes into engagement with the rotatable drum.

11. In a brake system for vehicles having brakes including a stationary plate, a rotatable drum concentrically positioned with respect to said plate, arcuate brake shoes pivotally mounted on said stationary plate and movable into engagement with said rotatable drum, and a spring interconnecting said brakes shoes for biasing same out of engagement with said rotatable drum, an auxiliary operating means for said brake system comprised in part by a ring gear mounted on said rotatable drum, a connector bar slidably mounted on said stationary plate and pivotally secured at one end to one of said brake shoes, cam follower bars disposed in closely spaced parallel relationship on the other end of said connector bar and the other of said brake shoes respectively, a slidable shaft mounted in said stationary plate, a cam on said slidable shaft positioned for sliding movement between said cam follower bars, a lever pivotally mounted on said stationary plate and connected to said slidable shaft and a pull cable attached to said lever for sliding the shaft to bring the spur gear into engagement with the ring gear for spreading apart the cam lugs and forcing the brake shoes into engagement with the rotatable drum.

References Cited in the file of this patent

UNITED STATES PATENTS

| | | |
|---|---|---|
| 1,303,553 | Graf | May 13, 1919 |
| 1,554,515 | Morgan | Sept. 22, 1925 |
| 2,001,229 | Ware | May 14, 1935 |
| 2,147,955 | Baits | Feb. 21, 1939 |
| 2,519,774 | Letner | Aug. 22, 1950 |
| 2,700,438 | Nallinger | Jan. 25, 1955 |